Feb. 9, 1960  P. A. DALE ET AL  2,924,171
REPEAT MECHANISM FOR CALCULATING MACHINES
Filed Dec. 4, 1956  6 Sheets-Sheet 1

INVENTORS
PAUL A. DALE
OSCAR F. LARSEN
BY
THEIR ATTORNEYS

Feb. 9, 1960 P. A. DALE ET AL 2,924,171
REPEAT MECHANISM FOR CALCULATING MACHINES
Filed Dec. 4, 1956 6 Sheets-Sheet 3

INVENTORS
PAUL A. DALE
OSCAR F. LARSEN

BY

THEIR ATTORNEYS

Feb. 9, 1960    P. A. DALE ET AL    2,924,171
REPEAT MECHANISM FOR CALCULATING MACHINES
Filed Dec. 4, 1956    6 Sheets-Sheet 4

INVENTORS
PAUL A. DALE
OSCAR F. LARSEN

BY *Karl Benst*
*Justin S. Crompton*

THEIR ATTORNEYS

Feb. 9, 1960   P. A. DALE ET AL   2,924,171
REPEAT MECHANISM FOR CALCULATING MACHINES
Filed Dec. 4, 1956   6 Sheets-Sheet 5

INVENTORS
PAUL A. DALE
OSCAR F. LARSEN
BY
THEIR ATTORNEYS

Feb. 9, 1960 P. A. DALE ET AL 2,924,171
REPEAT MECHANISM FOR CALCULATING MACHINES
Filed Dec. 4, 1956 6 Sheets-Sheet 6

INVENTORS
PAUL A. DALE
OSCAR F. LARSEN

THEIR ATTORNEYS

United States Patent Office 2,924,171
Patented Feb. 9, 1960

2,924,171

REPEAT MECHANISM FOR CALCULATING MACHINES

Paul A. Dale and Oscar F. Larsen, Ithaca, N.Y., assignors to The National Cash Register Company, Dayton, Ohio, a corporation of Maryland Application December 4, 1956, Serial No. 626,130

3 Claims. (Cl. 101—90)

This invention relates to a calculating machine for printing on a record card and its stub, and more particularly pertains to card shuttling and machine cycle control mechanism.

The record card and stub are printed with the same data in two machine cycles during which the card is shuttled past a printing station. A listing tape is also printed.

The invention is shown as applied to an adding machine of the type shown in United States Patent 2,654,537, which issued October 6, 1953, on the application of H. L. Lambert. This basic machine is operable in cycles to enter amounts into totalizer mechanism.

In order to keep the total correct, the machine has a first cycle for each transaction, in which the amount is entered into the totalizer, printed on the record material and listing tape, and a second cycle in which the same amount is not added into the totalizer, but is printed on another part of the record material and overprinted on the listing tape.

Means also is provided for normalizing the mechanism so that the machine can be used in single cycle operations as a straight listing-calculating machine.

The machine is equipped with mechanism for causing the machine to go through two cycles of operation by one initiating movement of the machine trip mechanism.

With these and incidental objects in view, the invention includes certain novel features of construction and combinations of parts, a preferred form or embodiment of which is hereinafter described with reference to the drawings which accompany and form a part of this specification.

Of the drawings:

Fig. 6 is an exploded perspective view of the main train of mechanism of the invention, showing the machine trip means, the means whereby an automatic two-cycle operation is performed, and the normalizing mechanism;

Fig. 7 is a detail in side elevation of the drive means for the mechanism of the invention.

*Main operating mechanism*

The frame of the machine, insofar as it relates to the invention, includes a left vertical side plate 20 (Figs. 3 and 4), a right vertical side plate 21 (Figs. 2, 4 and 6), a back brace frame plate 22 (Figs. 4 and 5), and a bottom cross-piece 23 (Fig. 6) supported by the left and right vertical side frame plates and running across from the right side to the left side of the machine.

The complete mechanism for giving the machine cycles of operation is best shown in United States Patent 2,760,722, which issued August 28, 1956, on the application of Nelson Friedberg et al., but only that portion of such mechanism will be described that is necessary to give an understanding of the invention.

Figure 3:
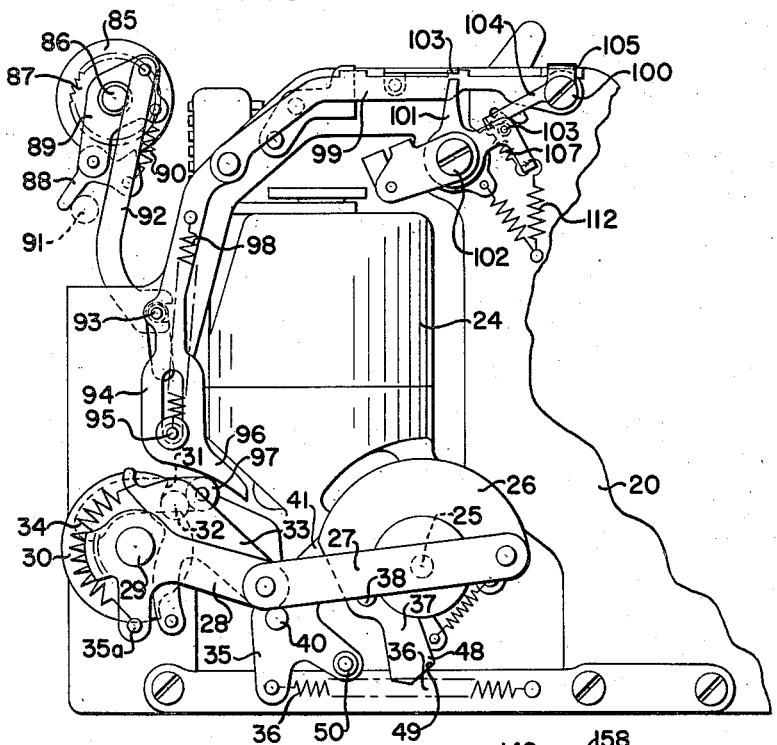
Fig. 3 is a view of the rear end of the left side of the machine with the case removed.

An electric motor 24 (Fig. 3) when it is energized, turns a stub shaft 25 on which is loosely mounted a crank plate 26. To the crank plate 26 is pivoted a link 27, the other end of which is pivoted to an arm of a bell crank 28, loosely mounted on rear drive shaft 29. Secured to drive shaft 29 is a disk 30, having a notch 31 in which rides a roller stud 32 on a lever 33, pivoted to the rear end of link 27. A strong spring 34 extending between the outer end of lever 33 and stud 35a on bell crank lever 28, holds the roller stud 32 in the notch 31, so that if bell crank 28 is rocked, it will rock rear drive shaft 29. This construction is used so that it may uncouple in case of the machine stalling. The direction of rotation of shaft 25 is counter clockwise, as seen in Fig. 3. One complete rotation of disk 26 constitutes a machine cycle, and in so making such a rotation the rear drive shaft 29 is rocked first clockwise and then counter-clockwise, as seen in Fig. 3.

Referring to Fig. 3, crank plate 26, as has been said, normally rides free on motor driven shaft 25, but there is provided on plate 26, and pivoted thereto a pawl 37, which, when moved counter-clockwise around its pivot 38, connects the crank plate 26 with the motor shaft. This movement of pawl 37 counter-clockwise, as seen in Fig. 3, is caused by the tension of spring 39 unless restrained. When the machine is at rest, arm 41 of a three-armed lever 35, secured to a shaft 40, prevents the pawl 37 from engagement. As the machine is released, as will be described, the three-armed lever 35 is rocked to ineffective position counter-clockwise, as seen in Fig. 3, or clockwise, as seen in Fig. 6, to which attention is now directed.

On the right end of shaft 40 is a lever 43, having a step 44 which, when the machine is at rest, engages an upper shoulder 45 on a trip latch member 46. The trip latch member is swung from a stud 47, said stud being supported by an auxiliary frame member, not shown. If the latch member 46 is allowed to swing clockwise, as shown in Fig. 6, the shaft 40 will turn in the same direction, in response to the urge of a spring 36, connecting up the motor shaft 25 and the motor driven crank plate 26 (see Fig. 3). This same movement of lever 43 causes the closing of a supply circuit to the motor, as described in United States Patent 2,745,601, which issued on the application of R. G. Fowler et al., May 15, 1956, but as it forms no part of the present invention, a showing of it has been omitted herein.

Referring to Fig. 3, as crank plate 26 rotates and comes near home position, a surface 49 on an arm 48 thereof will strike roller stud 50, knocking three-armed lever 35 clockwise, as seen in Fig. 3, and counter-clockwise as seen in Fig. 6, whereupon stud 51 on lever member 43 (Fig. 6) will strike latch member 46, knocking it to latching position and relatching it on shoulder 45.

The machine is equipped with a motor bar 55 (Fig. 1) which has stems 56 and 57 extending downwardly on the right side of the machine. The lower end of stem 56 has a foot 58 (Fig. 2) resting on top of a stud 59 on a bell crank lever 60, pivoted at 61 to machine trip lever 62. Machine trip lever 62 is pivoted to right side plate 21 by a stud 63. The upper extending arm of bell crank lever 60 has an ear resting against an upwardly extending arm of machine trip lever 62, and said ear is held against the upward extending arm of machine trip lever 62 by a spring 64 extending between said upwardly extending arm of lever 60, and a forwardly extending arm of machine trip lever 62. The forwardly extending arm of machine trip lever 62 has an ear 65, which rests against the upper edge of frame plate 21, and is resiliently held there by a spring 66. As the motor bar 55 is depressed the lever 60 rocks clockwise, carrying machine trip lever 62 in the same direction. A downwardly extending arm 67 of machine trip lever 62 has a leftwardly bent ear 68 (Fig. 6) to which is pivoted a link 69, pivoted at its rear end at 70 to a lever 71, the left end of which enters a hole in trip latch 46, the rightward end having a slot 72. Lever 71 is pivoted for support at 73 on cross member 23.

The result of this is that when the motor bar is depressed, link 69 is drawn forwardly and lever 71 is swung counter-clockwise, as seen in Fig. 6, which trips the machine, starting a cycle of operation. At the end of a cycle of operation the parts are returned to normal, except when the motor bar is held down or the lever 71 is held in tripped position, by other means, as will be explained, which, upon occurring, will cause the machine to continue to cycle.

*Paper handling mechanism*

Figure 1:
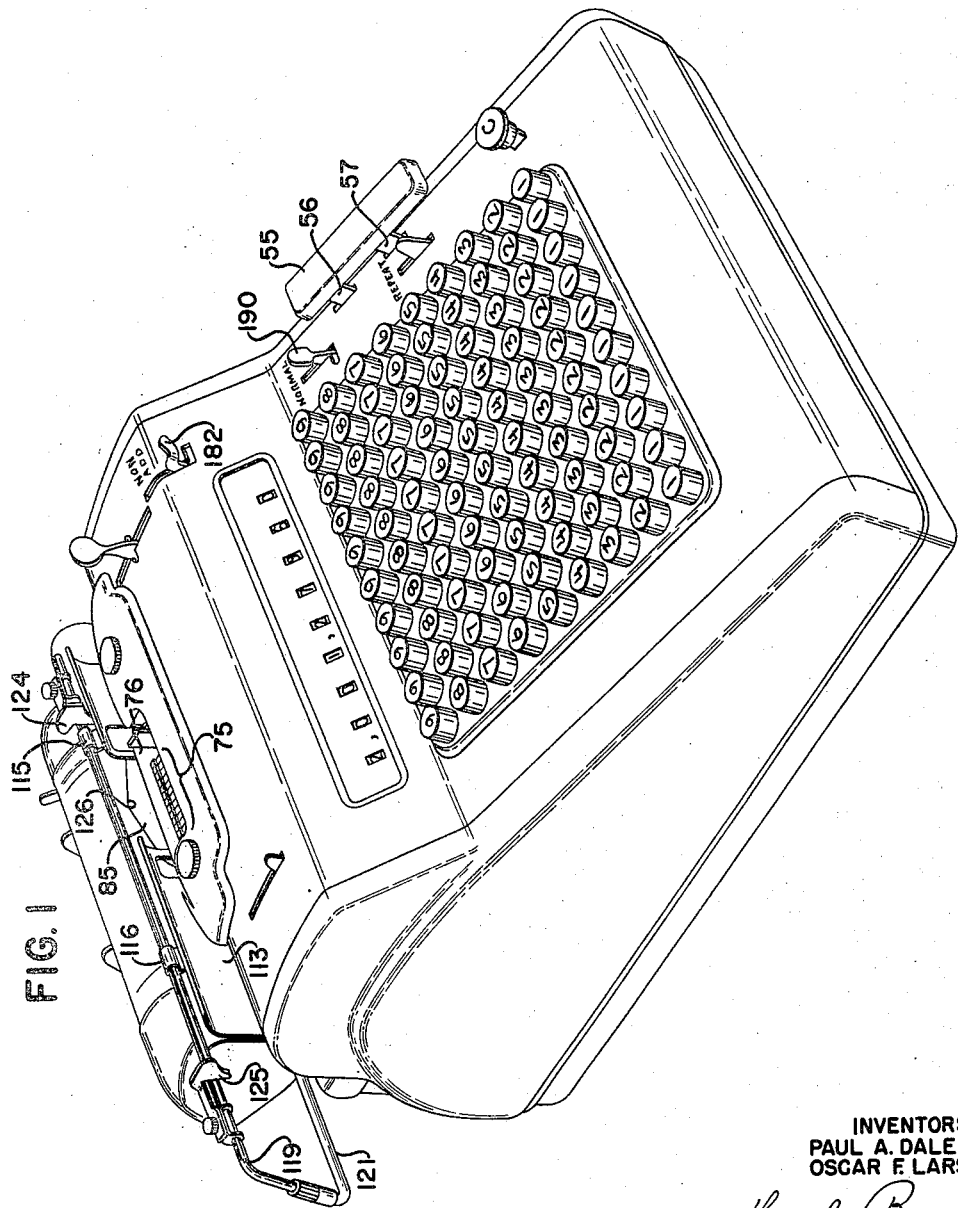
Fig. 1 is a perspective view of the machine as seen from the left front.

Referring to Fig. 1, as in the United States Patent 2,745,601, which issued on the application of R. G. Fowler, et al., to which refernce has been made, there is provided at the rear end of the machine a set of type bars 75 which, as described in said patent, are set to represent the value of the amounts set up on the keyboard in a particular operation. Type carried by the type bars are caused to have a printing action at about midcycle. These type print through an ink ribbon 76 against record material held in a shuttle frame and on a platen, now to be described.

Figure 4:
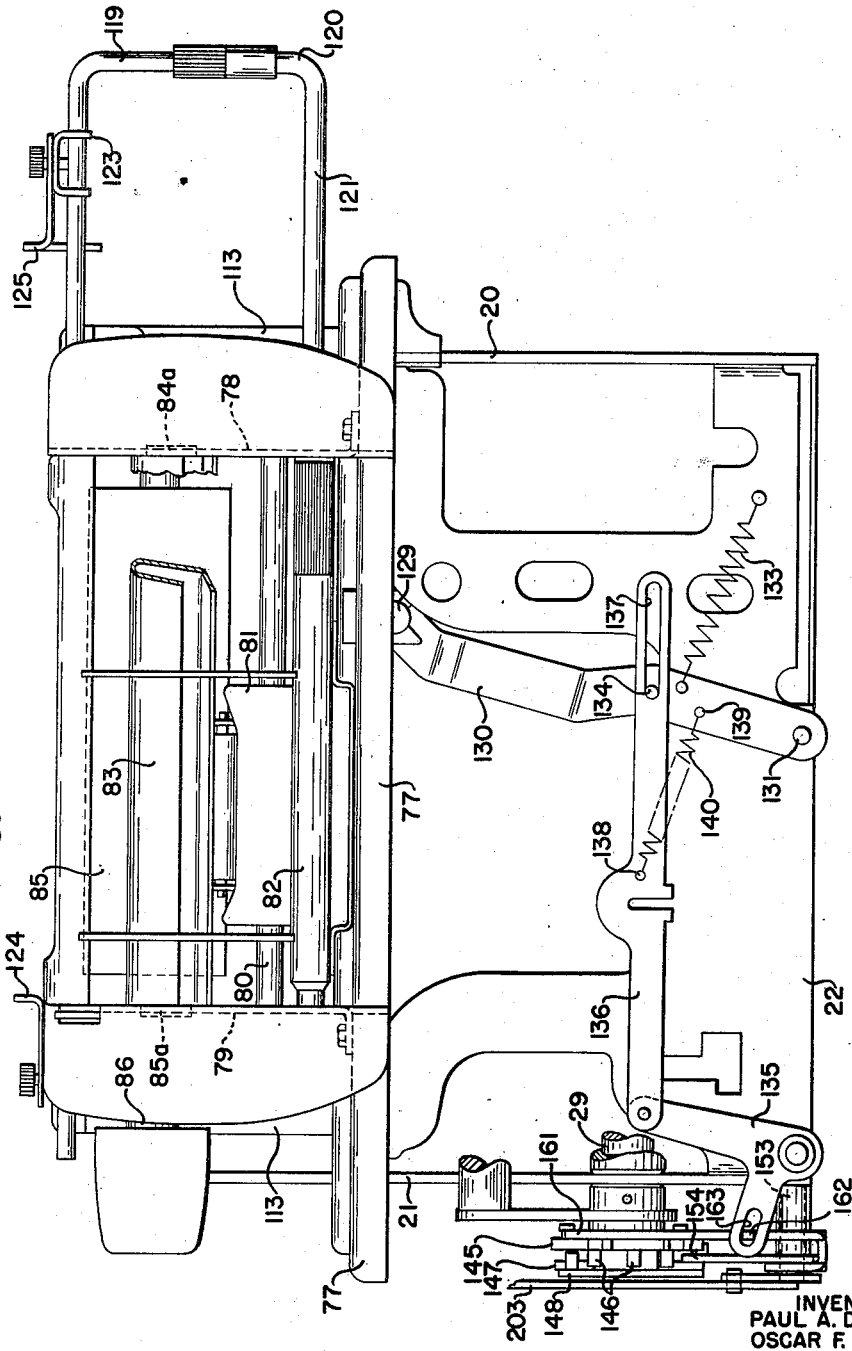
Fig. 4 is a rear view of the machine with the case removed.
Figure 5:
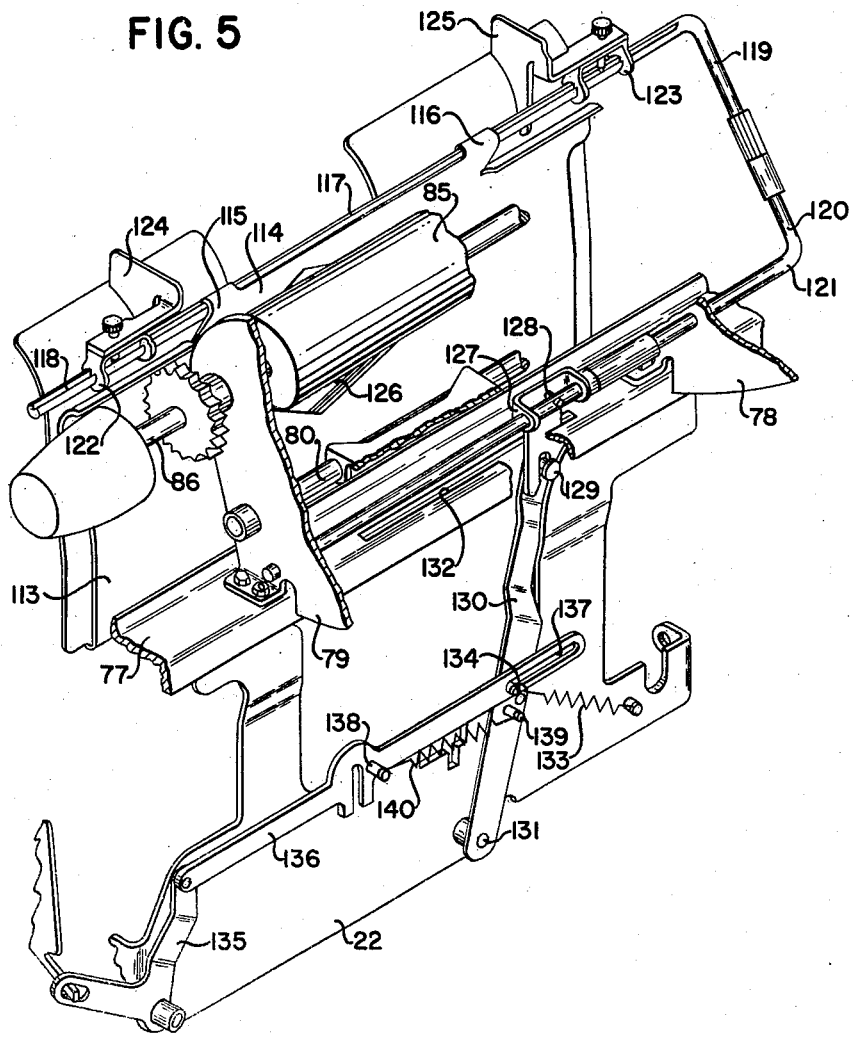
Fig. 5 is a perspective detail of a portion of the shuttle, card holding, and platen mechanisms.

Referring to Figs. 4 and 5, there is provided a paper carriage support bar 77 running crosswise of the machine and supported on rear frame brace 22. Bolted to support bar 77 are a left upright platen and paper roll support plate 78 and a right platen and paper roll support plate 79. Extending between and into the plates 78 and 79 is a rod 80, on which is pivoted a member 81, spring-urged toward a paper roll spindle 82, held by plates 78 and 79, by a spring, not shown. The function of member 81 is to bear against the paper roll on spindle 82 so as to prevent backlash. Also extending between plates 78 and 79 is a paper guide bar 83 of U-shaped cross-section, having the legs of the U bent slightly toward each other. This paper guide bar is secured in plates 78 and 79 by tenons 84a and 85a. The paper tape is brought around the outside of the paper guide bar 83 and projected from there downwardly and around the rear of paper platen 85 which is mounted on a spindle 86 projecting through the plates 78 and 79.

Secured to the left end of the platen spindle 86 (Fig. 3) is a toothed ratchet wheel 87, adapted to be engaged by a pawl 88 pivoted to a lever 89 loosely mounted on spindle 86. The pawl 88 constantly is urged by a spring 90 so that its tooth will move toward the teeth on ratchet wheel 87. When the machine is at rest a rearwardly and downwardly extending leg of pawl 88 comes to rest on a stop 91, which holds the tooth of pawl 88 from engaging the toothed ratchet wheel 87.

Pivoted to lever 89 is a link 92, the lower end of which is bifurcated to engage a stud 93 on a link 94, which link 94 embraces a stud 95 in the left frame plate 20. The under surface of a foot 96 on link 94 rests on roller stud 97 secured on a plate secured to shaft 29. A spring 98, extending between a stud on link 94 and stud 95 urges link 94 downwardly, but link 94 is normally restrained by the contact of foot 96 on roller stud 97. During the first half cycle of a machine operation, roller stud 97 moves to the right and downwardly, allowing downward movement of link 94, which gives the ratchet the first half of a feeding movement to cause the platen to turn the tape upwardly. In the last half of the machine cycle, stud 97 again makes contact with foot 96, raising link 94 to complete the ratchet action. Pivoted to the upper end of link 94 is a lever 99, pivoted at 100 to the left frame plate 20.

All of the foregoing platen advancing mechanism is described in United States Patent 2,745,601, before mentioned.

As has been stated previously, the operation of the machine in a double cycle requires that the platen be not given an advance movement to carry the tape upwardly more than once; otherwise there would be two prints of the same amount on the tape. This machine will print the amount, and then overprint it on the first print, during the two cycles of operation. The machine, when adjusted to the two-cycle type of operation, normally prevents the platen from feeding more than once as will next be explained.

There is provided an arm 101, pivoted at 102 to the side frame plate 20, the end of which arm normally underlies a bent-over ear 103 on lever 99 so that, if said arm is left in normal condition, the link 94 can only partially complete its downward movement, such being insufficient to catch the next tooth of the ratchet wheel 87, thus preventing advance movement of the platen. Arm 101 is held resiliently in place with a stud 103 therein, held against an arm 104 of a non-space bail 105, also pivoted at 100 to the frame plate 20. The stud 103 and the arm 104 are held in contact by a spring 107. Referring to Fig. 6, the bail 105 extends across the top of the machine and is pivoted on the right vertical frame plate 21 at 106. Extending downwardly and rearwardly from the right end of bail 105 is an arm 109, resting on top of a stud 110 in a link 111, to be described in detail further on.

Referring back to Fig. 3, a spring 112 is provided to hold the arm 109 (Fig. 6) against stud 110. Link 111 is pushed up in the second half of the first of the two cycles of a two cycle operation, and remains there until the first half of the second cycle, so that the platen will not be advanced during the first cycle, but will be advanced during the second cycle.

*Shuttle carriage mechanism*

Referring to Figs. 4 and 5, there is secured to paper platen support plates 78 and 79 a card pocket 113, opening upwardly. The rear side wall 114 of the card pocket has bent-over ears 115 and 116, which freely grasp a rod 117, having along its top edge a longitudinal notch 118 and having its left end 119 bent downwardly and rearwardly, where it is coupled to the upwardly and forwardly extending portions 120 of a rod 121, extending rightwardly through platen support plates 78 and 79. The framework composed of rods 117 and 121 may, therefore, be shifted from left to right, and vice versa, with respect to card pocket 113, and with respect to platen 85. Stirrups 122 and 123 are adjustable slidably upon rod 117, the holes in said stirrups having formations which ride in notch 118 of rod 117. Stirrups 122 and 123 have mounted thereon form guides 124 and 125 which accordingly are adjustable on rod 118 to accommodate a card of the desired width. If the card is dropped into the pocket 113 and the frame moved from left to right and vice versa, the card will be moved horizontally with respect to the platen 85. Apertures 126 are provided in the pocket 113 so that the type may be projected against the record material backed up by the platen 85. Inasmuch as the card carried by card pocket 113 is positioned between the type and the listing tape supplied from the paper roll on spindle 82, resort must be had to means for causing the impression made on the record card to print on the listing tape. One way of doing this is to have the paper roll double-wound with the back side of the overlying strip being coated with a transfer material which will make a distinctive mark on the underlying strip, in the usual manner.

Mounted on rod 121 is a shuttle fork 127 secured thereto by a pin 128. The downwardly projecting bifurcation of shuttle fork 127 engages a stud 129 on the top end of a lever 130, pivoted to the back frame brace 22 by a pivot 131. The shuttle fork 127 extends through a slot 132 in the carriage support bar 77. The shuttle frame is shown in normal position, to the left, in Fig. 5, where it is held by a spring 133, extending between the rear brace frame 22 and a stud 134 on lever 130. Pivoted to a shuttle bell crank lever 135, pivoted to the rear frame brace 22, is a link 136, having in its left end a slot 137, said pivot 134 riding in said slot 137 and normally being held positioned in the slot as is shown in Fig. 5 by a spring 140. If bell crank 135 is rocked counter-clockwise, as seen in Fig. 5, it will cause lever 130 to rock counter-clockwise, as the spring 140 is made stronger than the spring 133, until the shuttle frame is in the rightmost position, as viewed from the front of the machine, and the shuttle fork is in the right end of slot 132. This causes the record card carried in pocket 113 to move so the left end of it is in printing position.

Figure 8:
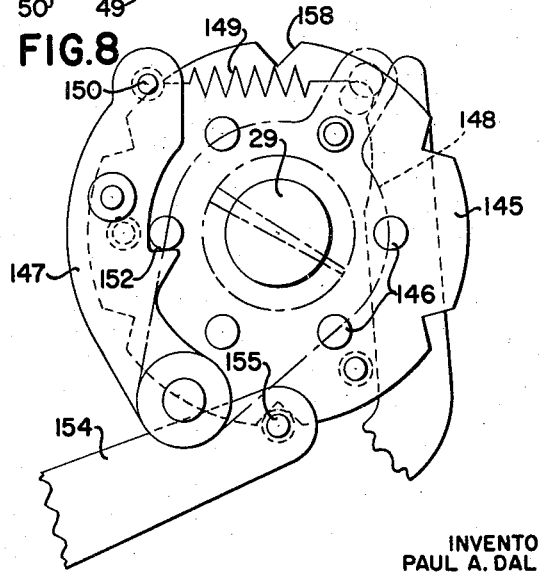
Fig. 8 is a detail side elevation of the drive pawl and detent mechanism of Fig. 7.

Loosely mounted for rotation on rear drive shaft 29 is a drive disk 145 (see Figs. 2, 4, 6, 7 and 8) having on its right face, as viewed from the front of the machine, arranged in a circle, six drive pins, like drive pins 146 (Figs. 6 and 7) adapted to be engaged by a drive pawl 147, pivoted to drive arm 148, which is pinned to the rear drive shaft 29. A spring 149 extends between stud 150 on pawl 147, and stud 151 on drive plate 148, which holds the drive pawl 147 in contact with the pins 146. Drive plate 148 oscillates first counter-clockwise and then clockwise each machine operation, just as does shaft 29, as viewed in Fig. 8, which is looking at said shaft from the right side of the machine. In so doing, the pawl 147, by its shoulder 152, normally drives the drive disk 145 60 degrees each machine cycle. Rotatably mounted on a frame-supported stud 153 is a detent bell crank 154 (Fig. 2), the rearwardly extending arm of which is equipped with a stud 155, which bears against the edge of drive disk 145, and is resiliently held there by a spring 156 extending between the upwardly extending arm of bell crank lever 154 and the spring anchor 157. The drive disk 145 has notches like notches 158, in which stud 155 comes to rest after the disk has moved its 60 degrees during the cycle, thus resiliently holding the drive disk 145 in the proper position. Extending from the left face of drive disk 145 are three pins spaced 120 degrees apart in circular fashion, two of these pins 159 being best shown in Figs. 6, 7 and 8. These three pins are intended every other cycle to rock a shuttle actuating lever 160, also mounted on stud 153, the rearwardly and upwardly extending arm 161 of which lever is engaged by the pins 159 as they move one at a time against it, every two cycles. A rearwardly extending finger 162 of lever 160 engages a slot 163 in bell crank lever 135 (see Figs. 4 and 5) and as the lever 160 is rocked every second cycle, bell crank lever 135 is rocked counter-clockwise to draw link 136 toward the right of the machine, as viewed from the front, which rocks lever 130 counter-clockwise, as seen in Fig. 4, to shuttle the frame composed of members 117 and 121, which carries the card to the rightmost position with respect to the platen. When drive disk 145 does not actuate the shuttle drive lever 160, the shuttle is returned to normal by spring 133. This, then, forms the shuttle drive mechanism. Next to be described is the control mechanism which coacts with the shuttle mechanism to control repeat print and non-add operations, as well as the disablement of the platen advancing means on intermediate cycles and the normalizing of the machine. There is also provided means to give the machine two cycles of operation automatically without having to manually operate the trip mechanism twice.

Two-cycle control mechanism

Figure 2:
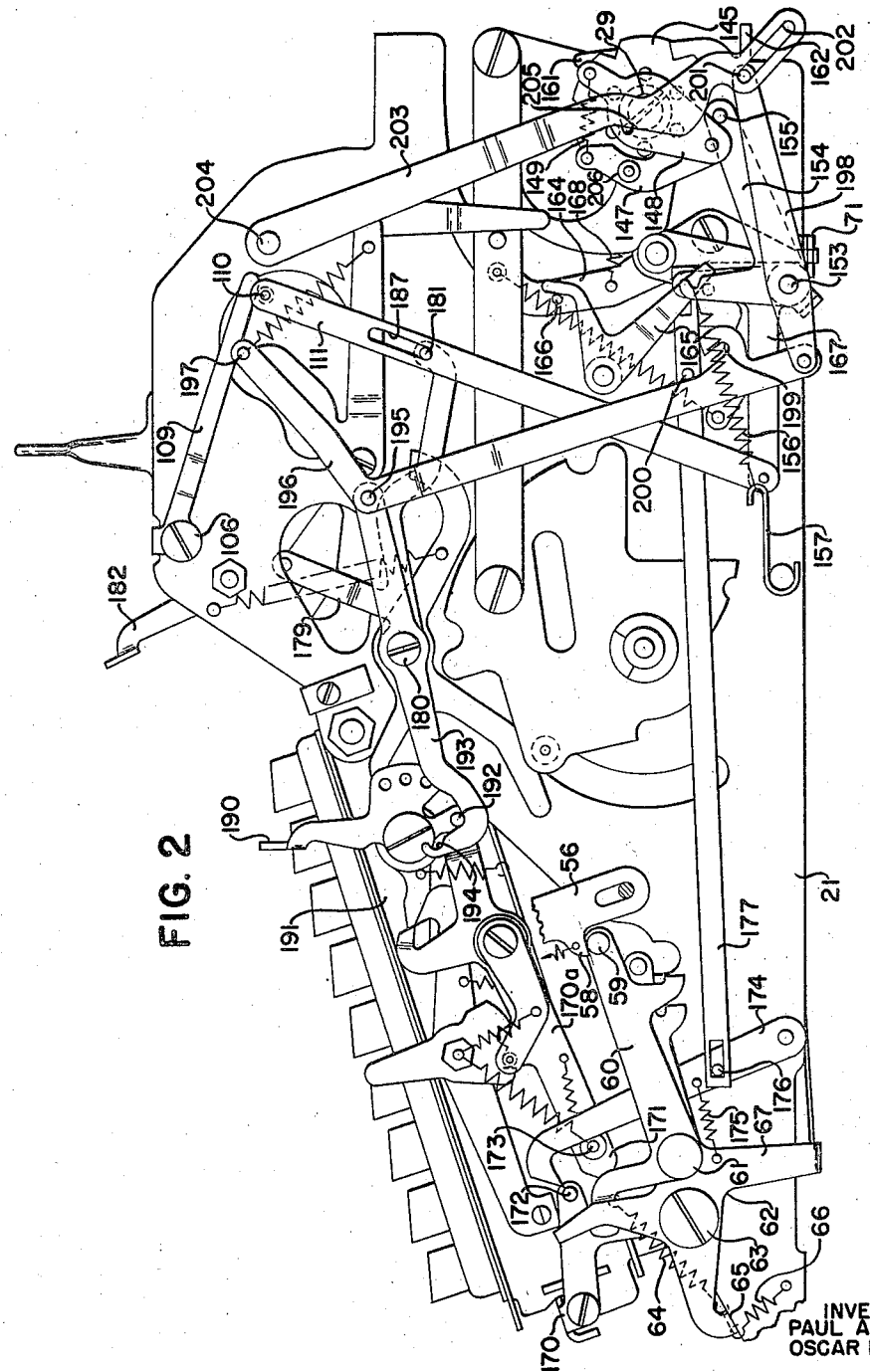
Fig. 2 is a view of the right side of the machine, with the case removed.

To the right side frame plate 21 (Figs. 2 and 6) is pivoted a lever 164, the lower end of which is inserted in slot 72 of lever 71, before described as being movable to trip the machine. By rocking lever 164 counter-clockwise, as seen in Figs. 2 and 6, lever 71 is given its machine tripping movement. Referring to Fig. 7, also pivoted to right frame plate 21 is a bell crank lever 165, the upwardly extending arm thereof being in back of and in contact with a stud 166 on lever 164, and the downwardly extending arm thereof being in back of and in contact with a stud 167 on shuttle actuating arm 160. As shuttle actuating arm 160 is rocked by one of the pins 159, in a clockwise direction, the bell crank lever 165 will be rocked in a counter-clockwise direction, which will rock lever 164 in a clockwise direction, and will hold lever 71 in tripped position until shuttle actuating arm 160 is allowed to return to normal position by the movement of drive disk 145. Thus, after the machine is set in operation by the motor bar 55, the machine will perform two cycles of operation automatically. Lever 164 will be aided in its return to normal position by a spring 168.

Automatic two-cycle repeat printing operation

There is disclosed in United States Paent No. 2,745,601, which issued on the application of R. G. Fowler, et al., to which reference has been made, mechanism for locking down the amount keys which are held in operated condition until released by the rocking of a key release bail 170 (Fig. 2) in a clockwise direction, at the close of a machine cycle. Inasmuch as in such a machine the keys control the extent of movement of the type bars, they must be held in depressed condition through the two cycles of operation, so as to get two printings of the same amount. The mechanism for rocking the bail 170 includes a lever 170a, pivoted to the right side plate 191 of the keyboard unit, which is given a clockwise movement during the first half of a machine cycle and a counter-clockwise movement at the close of a machine cycle. The forward end of key release lever 170a has pivoted thereto a by-pass pawl 171, which sweeps by stud 172 on its clockwise movement, without effect, and on its return movement counterclockwise, striking stud 172 solidly until it rocks the key release bail 170, whereupon lever 170a is permitted to move to home position. The by-pass pawl is pivoted to key release lever 170a by a stud 173, which projects rightwardly from the lever 170a. Pivoted to right side frame plate 21 is a hook 174, which will engage stud 173 as key release lever 170a rocks clockwise, preventing the full clockwise movement thereof, so that by-pass pawl 171 will not get past stud 172, consequently, preventing the release of the keys. This normal position of hook 174 is maintained by a spring 175.

Extending from lever 174 is a stud 176, playing in a slot in the forward end of a link 177. The rear end of link 177 also has a slot embracing a stud on the upwardly extending arm of lever 160 (see Fig. 6). As lever 160 is rocked clockwise on the second cycle of the two-cycle operation, the hook 174 will be rocked clockwise to ineffective position, allowing the key release lever 170a to perform its function and release the keys near the end of the two-cycle operation.

Non-add mechanism

Referring to Fig. 6, a stud 178 in the upper extending arm of bell crank lever 179, pivoted to the right frame plate at 180, is provided to control the engaging mechnism for the totalizer in the manner described in United States Patent 2,760,722, which issued August 28, 1956, on the application of Nelson R. Frieberg, et al. The stud is shown in ineffective position in Fig. 6, but by rocking lever 179 counter-clockwise stud 178 is positioned to cause the totalizer not to engage. In two-cycle operations, wherein the shuttle mechanism is effective, the rocking of shuttle actuating lever 160 in the second half of the first cycle causes the link 111, pivoted to its rear end, to rise, carrying with it stud 181 which is in the rearwardly extending arm of lever 179, thus positioning stud 178 in effective position and leaving it there until the last half of the second cycle. This will cause the machine to non-add the amount during the second cycle. Actuating lever 160 is returned to normal during the second cycle, and link 111 lowers at that time, moving stud 178 to ineffective position. A manually operated lever 182 is provided to accomplish the same purpose when the machine is normalized for single cycle operations wherein the carriage does not shuttle. Lever 182 is pivoted to the right frame plate. Pivoted to the lower end of lever 182 is non-add link 183 and non-add link 183 is pivoted at its lower end to non-add control plate 185, pivoted to the right side frame plate.

Pushing rearwardly on the top of lever 182 will cause the counter-clockwise rocking of non-add link 183 around stud 184, and the rear surface of notch 186 in non-add link 183 will strike stud 178 and rock lever 179 counter-clockwise so that stud 178 will be in effective position to cause a non-add operation of the machine. The slot 187 in link 111 permits this to be done.

*Mechanism for normalizing the machine for single-cycle operations without shuttle movement of the card pocket*

Referring to Fig. 1, there is provided a normalizing lever 190, which when pushed rearwardly causes the machine to be conditioned so that it will operate in single-cycle operations, will not shuttle the shuttle frame, will space up the platen on each operation, and will cause the key to release each operation of the machine.

The lever 190 is pivoted to the side plate 191 (Fig. 2) of the key bank unit, and has secured to the lower extending arm thereof a stud 192, which in Fig. 2 is shown resting in a formation in a lever 193, pivoted at 180 to the right side frame, to hold said lever 193 in two-cycle shuttle carriage position. If the normalizing lever is rocked clockwise, as seen in Fig. 2, stud 192 comes to rest in formation 194 of lever 193. Lever 193 has a rearwardly extending portion, having a stud 195 to which is pivoted an angular control member 196. As lever 190 is rocked clockwise, lever 193 rocks counter-clockwise which raises stud 195 and control member 196. The upper end of control member 196 has a stud 197 underlying arm 109 of bail 105, before described. Therefore, upon the rocking of lever 193 counter-clockwise, due to the shift of normalizing lever 190, the bail 105 is swung to ineffective position and the platen will advance the paper tape each machine cycle. The lower end of arm 196 is pivoted to a lever 198, pivoted on pivot 153. On the rear lower edge of member 196 is a hook formation 199 which when raised engages a stud 200 on link 177, pushing link 177 rearwardly to render hook 174 ineffective, thus allowing the keys to restore each machine cycle. The lever 198 is rocked clockwise, and a stud 201 thereon, which rides in a slot 202 of a lever 203, pivoted to the right frame plate at 204 causes the lever 203 to swing clockwise round its pivot, and a surface 205 thereon strikes stud 206 on feed pawl 147, rocking the pawl to ineffective position so that the shuttle mechanism will not operate.

Inasmuch as the drive disk 145 does not move, the shuttle actuating lever 160 will not be rocked, and the machine will only go through single-cycle operations.

What is claimed is:

1. In a calculating machine having a cyclically operable main operating means; trip means operable to initiate a cycle of machine operation; a printing means located at a printing station; a rotatable platen for holding a record tape opposite the printing means; platen spacing means operable each machine cycle to advance the tape; blocking means normally blocking the platen spacing means; a card pocket stationarily mounted between the platen and the printing means, said pocket having an upwardly opening card-receiving throat and an aperture allowing the printing means to make an impression on a card held in the pocket; a shuttle frame cooperating with a card in said pocket, said frame movable relatively to the pocket and consequently movable relatively to the printing means and printing station, said frame having two guides, one engaging each vertical edge of a card placed in the pocket between the guides, whereby movement of the shuttle frame causes the guides to shuttle the card inside the stationarily mounted card pocket and brings different portions of the card to the printing station; means operated by the main operating means to move the frame in one direction to a stopping point in one machine cycle, so a printing impression may be made on one portion of the card, and in the other direction to a stopping point in the next machine cycle, so a printing impression may be made on another portion of the card; and means operated by the main operating means when the trip means is operated to hold the machine tripped through the end of the cycle so it will perform a second cycle.

2. In a calculating machine having a cyclically operable main operating means; means capable of being tripped to initiate a cycle of machine operation; stop means normally operative at the end of a machine cycle to stop the machine from cycling; data keys operable to set up amounts to be printed; a printing means located at a printing station; a stationary record card pocket with an upwardly opening throat for receiving a card to be printed and having a side aperture opposite the printing station so a printed impression may be made on the card by the printing means; shuttle means engaging both sides of the card and operable for moving the card resting in the pocket from one extreme position to an opposite extreme position so that a printed impression may be made on it in either extreme position; and means operated by the main operating means to operate the shuttle in one cycle to move the card to one extreme position and in the next cycle to move the card to the other extreme position; and means that is automatically operable, once the machine is tripped, to block the stop means so that the machine will perform a second cycle of operation.

3. The machine of claim 2 in which key restoring means is provided that normally returns to normal operated keys at the end of a machine cycle; and in which means is provided to render the key restoring means ineffective during the first of a two cycle operation.

References Cited in the file of this patent

UNITED STATES PATENTS

| 1,635,691 | Rinsche | July 12, 1927 |
| 1,949,918 | Muller | Mar. 6, 1934 |
| 2,195,023 | Brown | Mar. 26, 1940 |
| 2,675,904 | Maurer | Apr. 20, 1954 |
| 2,745,601 | Fowler | May 15, 1956 |
| 2,760,722 | Frieberg | Aug. 28, 1956 |